United States Patent
Taylor et al.

(10) Patent No.: US 12,393,603 B2
(45) Date of Patent: Aug. 19, 2025

(54) DATA STORAGE SYSTEM WITH EFFICIENT DATA CHANGE REPORTING FOR REPLICATION

(71) Applicant: Dell Products L.P., Round Rock, TX (US)

(72) Inventors: Alan L. Taylor, Cary, NC (US); Nagapraveen V. Seela, Cary, NC (US); Anitta Jose, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 41 days.

(21) Appl. No.: 18/243,761

(22) Filed: Sep. 8, 2023

(65) Prior Publication Data

US 2025/0086198 A1  Mar. 13, 2025

(51) Int. Cl.
*G06F 16/27* (2019.01)
*G06F 16/23* (2019.01)
*G06F 16/25* (2019.01)

(52) U.S. Cl.
CPC .......... *G06F 16/27* (2019.01); *G06F 16/2379* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 6,148,368 A * | 11/2000 | DeKoning | G06F 12/0866 711/E12.019 |
| 7,647,463 B2 | 1/2010 | Jarvis et al. | |
| 7,890,469 B1 * | 2/2011 | Maionchi | G06F 16/10 707/654 |
| 8,073,922 B2 | 12/2011 | Bates | |
| 9,280,591 B1 | 3/2016 | Kharatishvili et al. | |
| 9,633,056 B2 | 4/2017 | Attarde et al. | |
| 2015/0134926 A1 * | 5/2015 | Yang | G06F 3/0652 711/167 |
| 2016/0306654 A1 * | 10/2016 | Diaconu | G06F 9/4881 |

* cited by examiner

*Primary Examiner* — Yu Zhao
(74) *Attorney, Agent, or Firm* — BainwoodHuang

(57) ABSTRACT

Selective replication of data in a data storage system includes tracking write transactions using tracking entries in a tracking structure. The tracking structure is periodically processed to create a reporting structure containing reporting entries each identifying a respective extent modified by one or more of the write transactions. The processing for each tracking entry includes (1) examining the reporting structure to determine whether the tracking entry expands an extent of a reporting entry, (2) based on the tracking entry not expanding an extent a reporting entry, creating a new reporting entry based on the tracking entry, and (3) based on the tracking entry expanding an extent of a reporting entry, modifying the reporting entry to identify the extent as so expanded. The reporting structure is used to perform a replication copy operation of the extents identified therein.

20 Claims, 4 Drawing Sheets

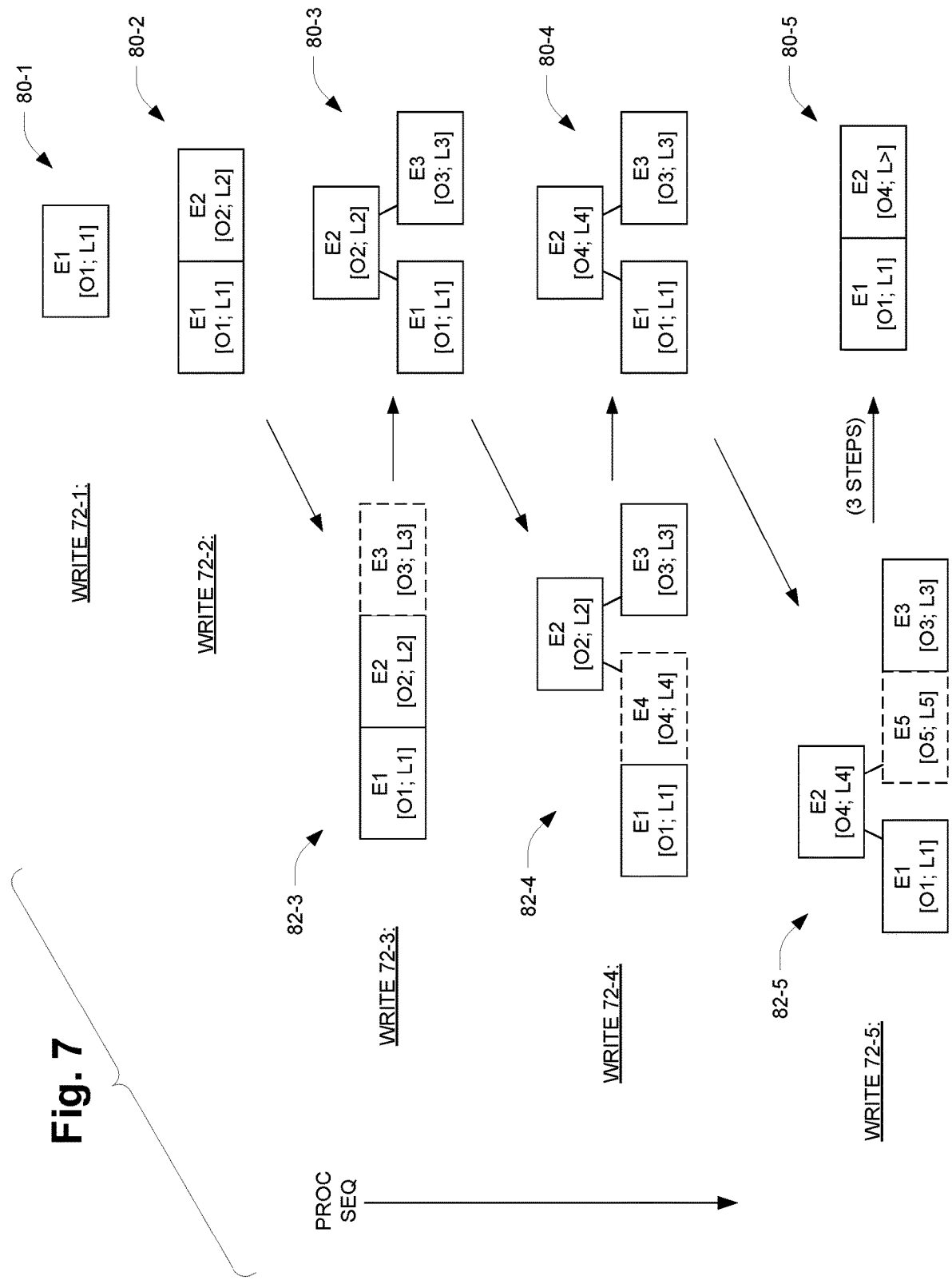

DATA STORAGE SYSTEM WITH EFFICIENT DATA CHANGE REPORTING FOR REPLICATION

BACKGROUND

The invention is related to the field of data storage systems that provide protective remote replication of data.

SUMMARY

A technique is disclosed for selective replication of data in a data storage system, which includes tracking individual write transactions using respective tracking entries in a tracking structure, each tracking entry identifying an extent of a respective write transaction. The tracking structure is periodically processed to create a reporting structure containing reporting entries each identifying a respective extent modified by one or more of the write transactions. The processing for each tracking entry includes (1) examining the reporting structure to determine whether the tracking entry expands an extent of any of a set of the reporting entries, (2) based on the tracking entry not expanding an extent of any of the set of reporting entries, creating a new reporting entry in the reporting structure based on the tracking entry, and (3) based on the tracking entry expanding an extent of one of the set of reporting entries, modifying the one reporting entry to identify the extent as expanded by the tracking entry. The reporting structure is subsequently used to perform a replication copy operation of the extents identified therein. The processing has a merging characteristic that enhances efficiency of storing and reporting data change information, as well as efficiency of the subsequent copy operation.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 7 is a schematic depiction of a sequence of states of a reporting structure as the writes of FIG. 6 occur.

DETAILED DESCRIPTION

Overview

Figure 1:
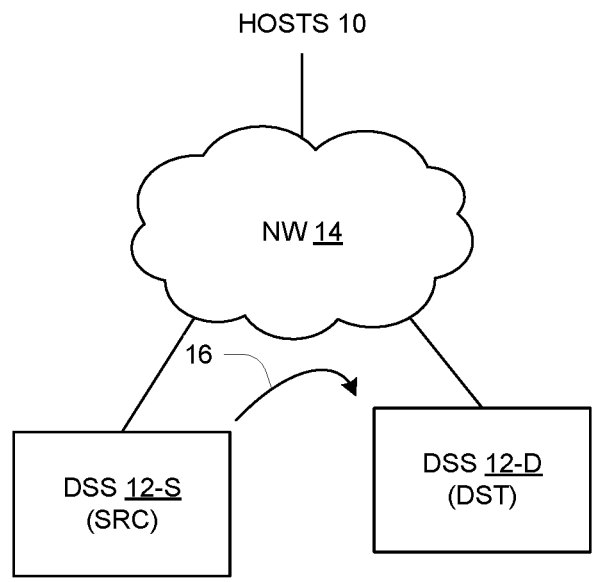
FIG. 1 is a block diagram of a data processing system having data storage systems configured for protective data replication.

In data storage environments employing asynchronous replication, there may be a Recovery Point Objective (RPO) target for a replication session, which indicates how far behind a destination (replica) is allowed to be from a source (production) volume. For example the RPO may be specified in minutes, and is selected based on the level of protection desired. A data storage system periodically performs replication backups in order to meet the RPO. The source data storage system tracks the changes that need to be replicated to the destination, and the changes are read from the source and written to the destination in each replication cycle. Currently there is a trend toward "Near-Zero" RPO less than 30 seconds.

One known RPO solution employs snapshot capabilities of a data storage system. Each RPO cycle is begun by creating a snapshot for the next RPO cycle. A copy is performed based on differences between snapshots for the current and previous RPO cycles. A system may use a differencing API to obtain the changes, process those changes to determine the data that actually needs to be copied (replicated), and then replicates the data to the remote destination. However, there can be drawback to the technique of identifying changes based on snapshot differences. For example, expensive flushes of cached data may be required in order to ensure correctness. Because of performance limitations, Near-Zero RPO may not be able to use such a technique for identifying changed data and still maintain a low target RPO (e.g., 30 seconds or less).

A disclosed technique tracks changed data (writes) using per-core data structures in cache memory that record the volume, offset, and length of each write during a replication cycle. The memory footprint is generally quite small compared to the size of the cache and typical active data set size. The technique employs a reporting structure having a merging characteristic that enhances efficiency of storing and reporting data change information, as well as efficiency of the subsequent copy operation.

In one embodiment the technique may employ a structure known as a "b-tree", which resembles a binary search tree and has certain general characteristics. For example, it grows by splitting into two halves and promoting a node, and all its leaf nodes are at the same depth (i.e., it maintains balance). Each node has a certain number of elements, each of which in the present context is an offset and length tuple for a modified extent to be replicated. On insertion of a new element, it is determined whether it can be merged with an existing element, which would be expanded accordingly. For example, adjacent writes are coalesced into a single larger write, and overwrites are tracked as one element, both of these being common occurrences in data storage. In general, the technique reduces the number of elements required to describe a set of changed data over an RPO cycle, versus a technique that simply records each individual write (offset and length), providing the above-described efficiency benefits.

Other aspects and variations are provided in the detailed description of embodiments below.

Embodiments

FIG. 1 shows a data processing system having a set of host computers (hosts) 10 coupled to data storage systems (DSSs) 12 via a network (NW) 14. As generally known, the DSSs 12 provide secondary storage services to the hosts 10, maintaining data storage objects such as volumes, logical disks, etc. that are implemented using underlying physical storage resources (e.g., magnetic media, Flash-programmable memory). The hosts 10 issue data writes and reads to/from these data storage objects, which are processed by the DSSs 12 to store write data and to retrieve stored data and return it in response to read requests.

The system of FIG. 1 employs a technique known as "asynchronous replication" for protection of stored data and ability to return the system to a recent operating condition after a disruption (e.g., failure of a production device). Thus in FIG. 1 the DSSs 12 are identified as a "source" (production) DSS 12-S and a "destination" (replica) DSS 12-D. In operation, a replication session is established between the two DSSs 12 and there is regular copying (replicating) of stored data from source DSS 12-S to destination DSS 12-D, as indicated by arrow 16. Pertinent details of replication operation and the manner of tracking data changes (writes) are described more below.

Figure 2:
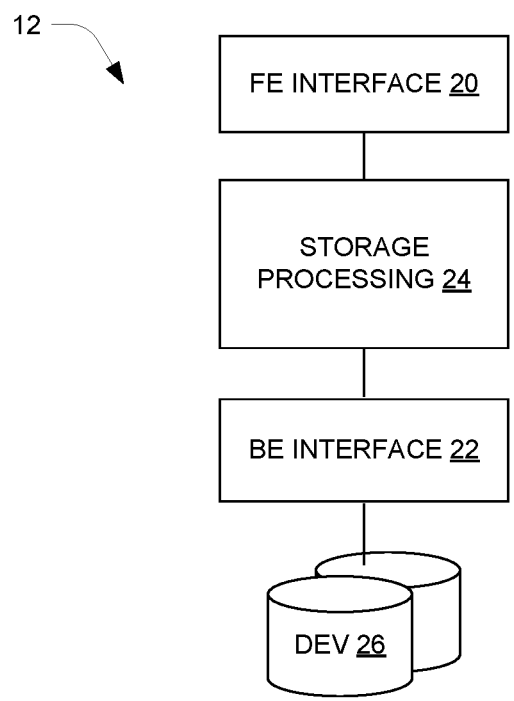
FIG. 2 is a block diagram of a data storage system from a hardware perspective.

FIG. 2 is a block diagram of a DSS 12 from a hardware perspective. It includes front-end (FE) interface circuitry 20, back-end (BE) interface circuitry 22, and storage processing circuitry 24. The FE circuitry 20 interfaces the DSS 12 to the network 14 and remote hosts 10 (FIG. 1), and the BE circuitry 22 provides functional connection to local storage devices (DEV) 26 such as magnetic disks, Flash-programmable memory, etc. The storage processing circuitry 24 stores and executes computer program instructions to realize a variety of functional components that provide the functionality of the various data storage services (e.g., primary storage, replication and recovery, data compression and security, etc.), using the other components 20, 22 and 26 as necessary for this functionality.

Figure 3:
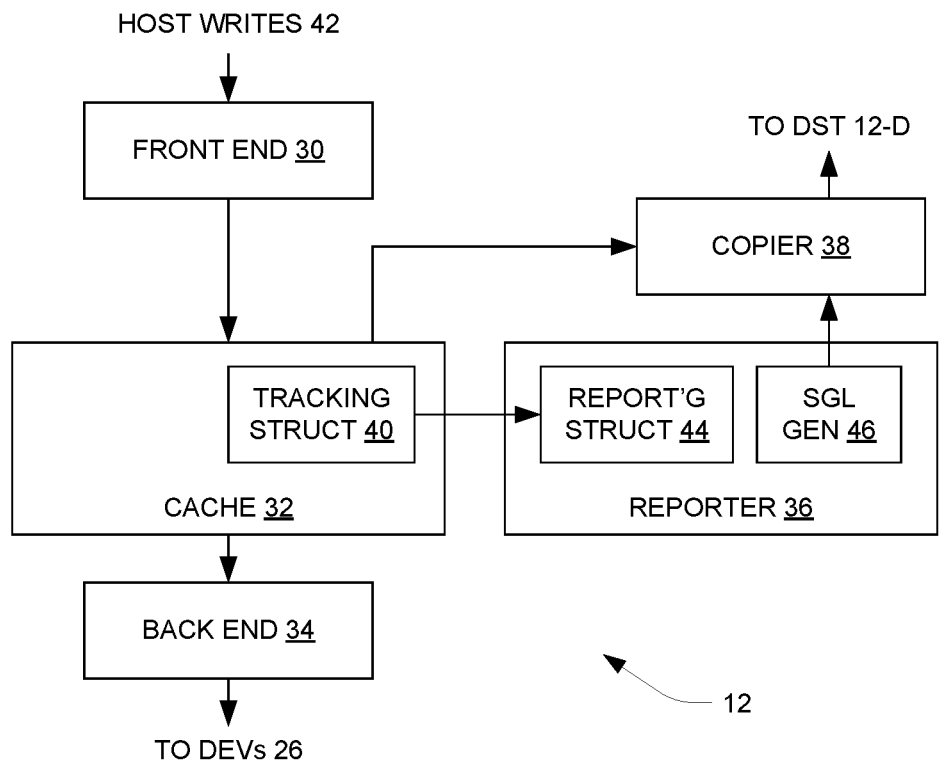
FIG. 3 is a functional block diagram of a data storage system in relevant part.

FIG. 3 is a functional block diagram of a DSS 12 in relevant part, where the various functions are provided by software-implemented components as described above. In particular, this diagram focuses on data write operations and associated tracking and reporting for replication purposes, as outlined above. Components include a front end 30, cache 32 and back end 34, as well as a reporter 36 and copier 38. The cache 32 employs a tracking structure 40 for tracking host writes 42. The reporter 36 employs a reporting structure 44 and a scatter-gather list (SGL) generator 46.

Overall operation is generally as follows, with additional details provided below. The front end 30 receives host writes 42 and applies them to the cache 32 (i.e., stores write data in designated locations as generally known). Under various conditions, data of the cache 32 is "destaged" or written out to backing storage on devices 26, via the back end 34. For replication purposes, writes occurring during replication cycles are tracked in the tracking structure 40, wherein the record or entry for each write includes information including an identifier of the device 26 to which the write is directed, as well as an offset and a length which describe the location of the data modified by the write, as generally known in the art. Also, because of concurrency between tracking and reporting as described below, the write records also include an identifier for the replication cycle in which they occur, which may be realized for example using a snapshot identifier when snapshots are used to bound the replication cycles.

The reporter 36 operates in each replication cycle to process the records of the tracking structure 40 to create records/entries in the reporting structure 44, which is then used by SGL generator 46 to send change information to the copier 38 in the form of an SGL. The copier 38 uses the information to copy changed data extents from the cache 32 to the destination DSS 12-D. As generally known, if data has already been destaged to a device 26 then the data is first brought back into the cache 32 and provided to the copier 38 for this replication copying operation.

Figure 4:
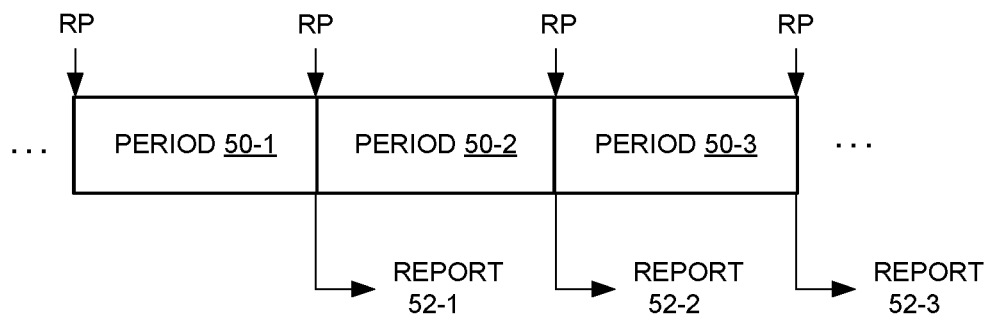
FIG. 4 is a schematic illustration of a sequence of replication periods.

FIG. 4 is a simplified schematic illustration of ongoing, cyclic replication operations as described above. Operation proceeds in a sequence of cycles or periods 50, each initiated by a command or operation shown as RP (recovery point). This command is generated by a higher-level controller of replication operation, which is not explicitly shown in the diagrams. At the end of each period 50 certain operations are performed to generate a corresponding report 52 (e.g., report 52-1 for period 50-1, etc.). The remaining description focuses primarily on details of the reporting, using a simple example to illustrate various structural and functional features.

Figure 5:
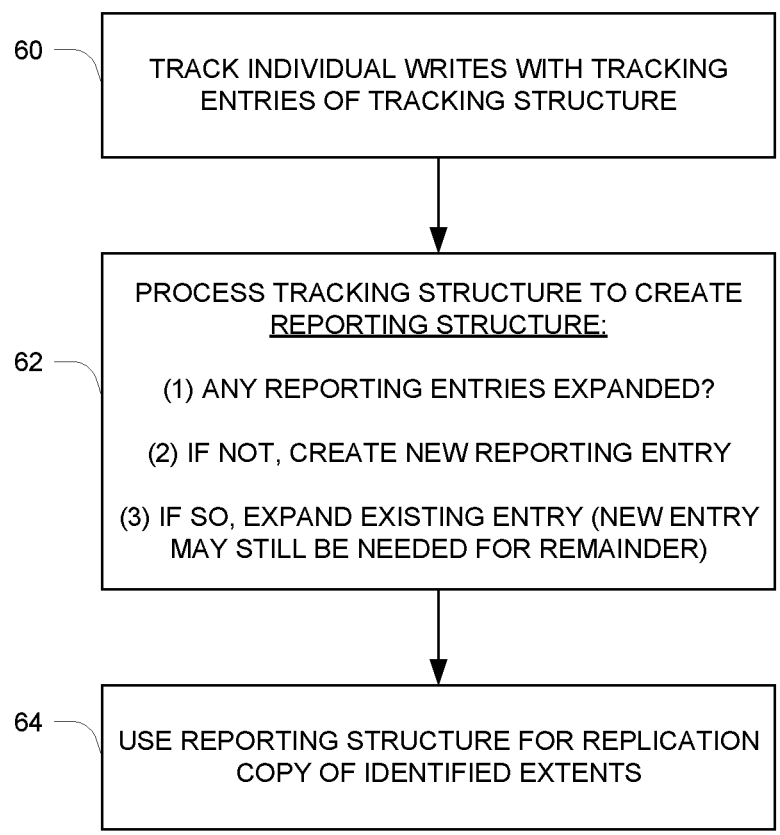
FIG. 5 is a flow diagram of operations of tracking and reporting writes for replication.

FIG. 5 is a flow diagram of replication-related operation with particular focus on reporting-related operations such as may be performed by the reporter 36 (FIG. 3).

At 60, individual write transactions are tracked using respective tracking entries in a tracking structure, wherein each tracking entry identifies an extent of a respective write transaction. In the embodiment of FIG. 3, this tracking is performed by cache 32 using the tracking structure 40. The term "extent" refers to the data that is written, identified with an offset (starting address) and length (e.g. in bytes). As noted above, each tracking entry may also include additional information such as the device ID and period ID (e.g., snapshot ID for the replication cycle/period).

At 62, the tracking structure is periodically processed to create a reporting structure, which is populated with reporting entries each identifying a respective extent modified by one or more of the write transactions. The processing for each tracking entry includes (1) examining the reporting structure to determine whether the tracking entry expands an extent of any of a set of the reporting entries (i.e., enlarge the size of such an extent), (2) based on the tracking entry not expanding an extent of any of the set of reporting entries, creating a new reporting entry in the reporting structure based on the tracking entry, and (3) based on the tracking entry expanding an extent of one of the set of reporting entries, modifying the one reporting entry to identify the extent as expanded by the tracking entry. It will be understood that this modifying operation, which may also be referred to as "merging" herein, provides part of the above-described efficiencies of storage and copying. In the embodiment of FIG. 3, this processing is performed by the reporter 36 using the reporting structure 44. All of these operations and attendant benefits are further described with reference to an example below.

At 64, the reporting structure is used to perform a replication copy operation of the extents identified therein. That is, the extents as represented in the reporting structure are the subject of the replication copying for that period. In the embodiment of FIG. 3, these operations are performed jointly by the reporter 36 and copier 38. The SGL generator 46 of reporter 36 uses the reporting entries of reporting structure 44 to create the SGL and provide it to the copier 38, which then performs the copy operation for these extents by reading the data from the cache 32 and sending it to the destination DSS 12-D for writing to a replica device.

Figure 6:
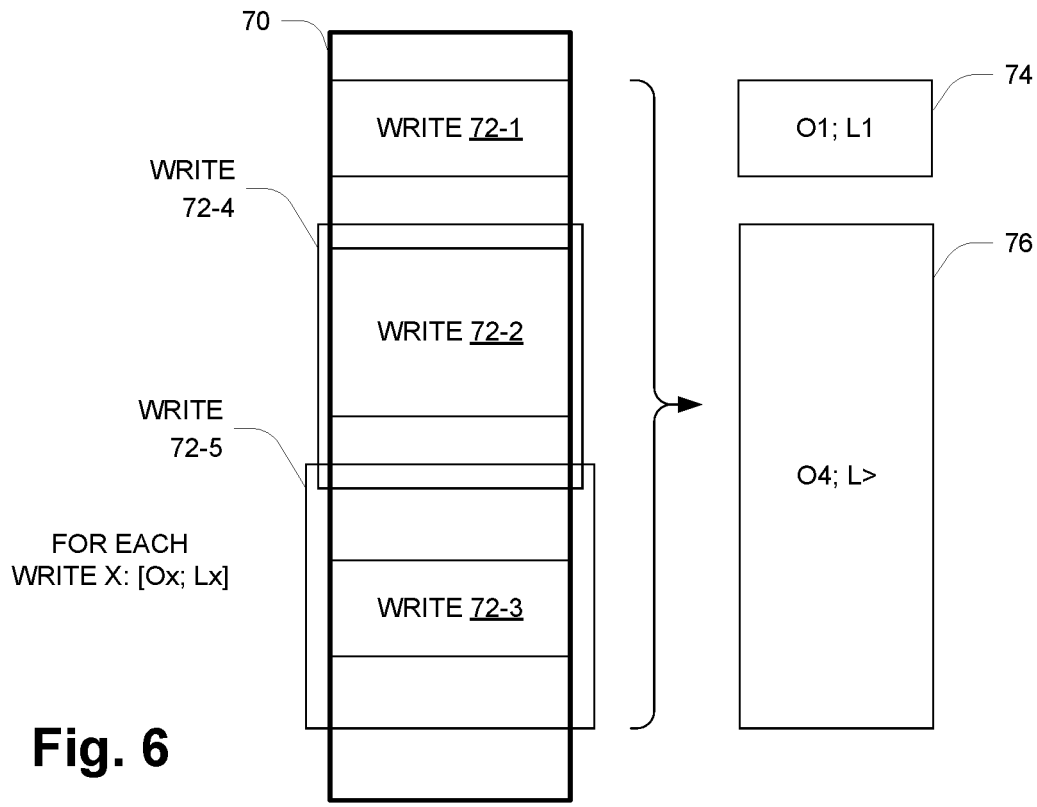
FIG. 6 is a schematic illustration of a sequence of writes occurring in parts of a storage extent.

FIGS. 6 and 7 describe a simplified example used to illustrate the above operations.

FIG. 6 shows an area 70 of storage of a device 26 and a pattern of five writes 72-1 through 72-5 performed in sequence. Writes 72-1 through 72-3 are directed to respective disjoint areas. Write 72-4 is to a range completely enveloping the range of write 72-2, and write 72-5 is to a range that overlaps part of the range of write 72-4 and completely envelopes the range of write 72-3. As indicated at left, each write is represented by an Offset (O) and Length (L) tuple [Ox; Lx]. As these writes 72 occur, they are logged individually in the tracking structure 40.

On the right side of FIG. 6 is shown the manner in which these five writes are eventually reported. The range for write 72-1 is reported as a first extent 74 with an offset-length of O1; L1, meaning the offset value from write 72-1 and the length value from write 72-1 (i.e., this range is identical to the range written by write 72-1). Because the result of writes 72-2 through 72-5 is one large contiguous region extending across all the regions for these writes, they are represented by a single second extent 74 that has offset value O4 (the offset of write 72-4) and a length value shown as "L>", which means it is an aggregated length that is computed based on the offsets and lengths of its constituent writes. In this example, omitting intermediate steps (which are described below), the value L> is equal to (O5−O4)+L5, where the term (O5−O4) captures the portion of write 72-4 that does not overlap with write 72-5.

FIG. 7 illustrates the contents of the reporting structure 44 as the writes 72-1 through 72-5 occur in this example. In this case the reporting structure 44 is realized using a so-called "b-tree", which is a generalization of a binary search tree. B-trees have various properties that make them suitable for this kind of application, i.e., capturing a pattern of data items scattered throughout a region. As explained below, standard b-tree manipulation is augmented to provide desired expanding (or merging) of existing entries to increase efficiency especially of the ensuing copy operation. In FIG. 7, the b-tree itself is indicated by reference 80, and its individual entries by the letter E. For each write 72-1 through 72-5 there is a corresponding resulting state of the b-tree, 80-1 through 80-5. Each entry E has an entry number (1, 2, . . . ) generally reflecting the sequence in which they are created (E1, E2, . . . ). Also shown for writes 72-3 through 72-5 are corresponding notional intermediate states of the b-tree 80, identified as 82-3 through 82-5. Each entry E has an offset-length tuple [Ox; Ly] following the scheme of FIG. 6, i.e., x and y are taken from corresponding ones of the writes 72-1 through 72-5 or are calculated, which is represented by ">". In this simplified example, it is assumed that the tree 80 is binary and that each node can store up to two entries Ex.

For write 72-1, a first entry E1 is created with offset-length of [O1; L1] and stored in the tree 80, resulting in the tree state 80-1 having a single node storing E1.

Once the tree 80 is populated with at least one node, then in subsequent insertions there is an initial step of examining certain nodes to determine if they can be expanded to incorporate some or all of the range of a subsequent write being processed. As noted, this may also be referred to as "merging." Thus for write 72-2, for example, its values are compared with those of the single entry E1. In this case, the ranges are disjoint, so no expanding is possible. Thus, a second entry E2 is created with offset-length of [O2; L2] and stored in the tree 80, resulting in tree state 80-2. The entry E2 is added to the one node already storing entry E1. E2 is added to the right of E1, due to its location in a higher address range.

For write 72-3, there is a notional intermediate state 82-3 in which entry E3 is added to the right of entry E2, due to its higher address range (note that the range for write 72-3 does not adjoin or overlap either E1 or E2, so no expanding/merging is possible). However, because the single node is already full, a new node must be added. The existing node is logically "split" into two same-level nodes, one storing E1 and the other storing E3. The notionally intermediate entry E2 is elevated one level and its node is given pointers to the nodes storing E1 and E3 (tree state 80-3).

At this point no efficiency has been gained, as there are three entries E1-E3 for the three writes 72-1 through 72-3, due to the lack of expanding/merging opportunities. However, this changes as writes 72-4 and 72-5 occur, as explained below.

For write 82-4, there is a notionally intermediate state 82-4 in which E4 fits between E1 and E2 due to the position of its range (it could be part of the E1 node as shown or of the E2 node). However, as shown in FIG. 6, write 72-4 completely envelopes the range for write 72-2, which is represented in entry E2. Thus, entry E2 can be expanded to represent the entire range covered by writes 72-2 and 72-4, which in this case is the same as the whole range of write 72-4. The result is tree state 80-4 in which entry E2 now has values [O4; L4].

The processing is similar for write 72-5 which has notional intermediate state 82-5. In this case multiple merges occur. Referring again to FIG. 6, write 72-5 partially overlaps write 72-4 (which is represented by existing entry E2) and completely envelopes write 72-3 (represented by entry E3). The merging may occur in a variety of ways depending on implementation. In one example approach, it may occur as follows:

1. Write 72-5 merged into entry E3 (E3 expanded), based on overlap.
2. Entry E3 merged into entry E2 (E2 expanded), based on overlap. E2 has offset O4 and the calculated length L> as described above with reference to FIG. 6.
3. With the tree 80-5 reduced to only two entries E1, E2, it can be collapsed to one level holding only one 2-entry node, which is depicted in FIG. 7 (tree state 80-5). Alternatively, the two-level structure may be maintained, with the right-hand pointer for the root node (storing E2) being a null value (due to deletion of entry E3 after merging).

The above-mentioned efficiencies will be apparent based on the above example. The reporting structure 44 in the form of b-tree 80 finally stores only two entries E1, E2 representing the two extents 74, 76 that result from five writes 72-1 through 72-5. Only two copying operations are involved rather than five, and there is no duplicated copying of sub-regions corresponding to overlaps (e.g., the entire region of writes 72-2 and 72-3, and the overlap between writes 72-4 and 72-5).

The above example also illustrates that merging occurs both horizontally (nodes at same tree level) as well as vertically (nodes at different levels), as described above for write 72-5 for example.

The above uses a conventional approach of splitting nodes "in the middle", i.e., dividing their entries equally between two new nodes. Because the entries Ex represent ranges, there is a notion of "distance" between the entries and thus their nodes, which could be used to perform splitting in some different way that might provide an operational benefit. If highly sequential data is detected then there could be a decision to promote not the middle element but rather an element positioned mid-way in terms of its range relative to ranges of other elements. This may provide for nodes to remain fuller over time and make more efficient use of storage space for the reporting structure.

While various embodiments of the invention have been particularly shown and described, it will be understood by those skilled in the art that various changes in form and details may be made therein without departing from the scope of the invention as defined by the appended claims.

What is claimed is:

1. A method of selective replication of host data stored in a data storage system, comprising:
   establishing and maintaining a replication session with a second data storage system; and
   as part of the replication session, in each of ongoing replication cycles in which write transactions store newly written host data in the data storage system, (1) creating a reporting structure identifying the newly written host data to be replicated, and (2) copying the newly written host data identified in the reporting structure to the second data storage system for replication,
   wherein creating the reporting structure includes:
      (i) tracking individual write transactions using respective tracking entries (TEs) in a tracking structure, each tracking entry identifying a respective TE extent of a respective write transaction; and
      (ii) processing the tracking structure to create the reporting structure containing reporting entries (REs) each identifying a respective RE extent modified by one or more of the write transactions, the processing for each tracking entry including (a) examining the reporting structure to determine whether the TE extent of the tracking entry expands, by overlapping, an RE extent of any of a set of the reporting entries, (b) based on the TE extent of the tracking entry not expanding an RE extent of any of the set of reporting entries, creating a new reporting entry in the reporting structure based on the tracking entry, and (c) based on the TE extent of the tracking entry expanding an existing RE extent of one of the set of reporting entries, modifying the one reporting entry to identify an expanded RE extent spanning the existing RE extent and the TE extent of the tracking entry,
   the modifying of the one reporting entry reducing an amount of the newly written host data copied in the copying step by an amount of overlap between the existing RE extent and the TE extent of the tracking entry.

2. The method of claim 1, wherein each tracking entry includes an offset and length for the TE extent of the write transaction, and further includes a device identifier and replication period identifier, the device identifier identifying a storage device to which the write transaction is directed, the replication period identifier identifying a specific replication period in which the write occurred and for which the tracking, reporting and copying operations are performed.

3. The method of claim 2, wherein the replication period identifier is a snapshot identifier for a data snapshot taken at a boundary of the replication period.

4. The method of claim 1, wherein the copying includes generating a scatter-gather list from the reporting entries of the reporting structure and providing the scatter-gather list to a copier component for copying RE data extents identified therein.

5. The method of claim 1, wherein determining whether the tracking entry expands an RE extent of any of the set of the reporting entries includes determining whether the tracking entry is directed to an extent either adjoining or overlapping an RE extent of any of the set of reporting entries.

6. The method of claim 1, wherein an expanded reporting entry is created based on a plurality of constituent write transactions that have modified the TE extents thereof, and includes (1) an offset taken from a lowest-range one of the constituent write transactions, and (2) an aggregated length value calculated using respective offsets and lengths of the constituent write transactions.

7. The method of claim 1, wherein the reporting structure includes a b-tree employing a plurality of tree-organized, multi-entry nodes in which entries are ordered according to locations of their respective RE extents, and wherein creating a new reporting entry includes one of (1) adding the new reporting entry to an existing node, or (2) creating a new node and adding the new reporting entry to the new node.

8. The method of claim 7, wherein creating a new node occurs as part of a node splitting operation for an existing node, the node splitting resulting in (1) the new node as a peer of the existing node, and (2) a new next-level node pointing to both the existing node and the new nodes, and wherein the new reporting entry and existing reporting entries of the existing node are distributed among the existing node, new node and new next-level node in a predetermined manner.

9. The method of claim 8, wherein (1) the new next-level node receives a middle reporting entry among the reporting entries being distributed, (2) the existing node receives one or more of the existing reporting entries located below the middle reporting entry, and (3) the new node receives the new reporting entry.

10. The method of claim 7, wherein modifying the one reporting entry includes expanding its RE extent to incorporate part or all of an RE extent of a peer reporting entry at a same level of the b-tree.

11. The method of claim 7, wherein modifying the one reporting entry includes expanding its RE extent to incorporate part or all of an RE extent of a child reporting entry at a next lower level of the b-tree.

12. A data storage system, comprising:
   storage devices for storing host data;
   front-end (FE) circuitry providing an interface to a network and remote hosts;
   back-end (BE) circuitry providing functional connection to the storage devices; and
   storage processing circuitry storing and executing computer program instructions to cause the data storage system to selectively replicate stored host data to a remote replica system, by:
      establishing and maintaining a replication session with the remote replica system; and
      as part of the replication session, in each of ongoing replication cycles in which host write transactions store newly written host data in the data storage devices, (1) creating a reporting structure identifying the newly written host data to be replicated, and (2) copying the newly written host data identified in the reporting structure to the remote replica system for replication,
   wherein creating the reporting structure includes:
      (i) tracking individual write transactions using respective tracking entries (TEs) in a tracking structure, each tracking entry identifying a respective TE extent of a respective write transaction; and
      (ii) processing the tracking structure to create the reporting structure containing reporting entries (REs) each identifying a respective RE extent modified by one or more of the write transactions, the processing for each tracking entry including (a) examining the reporting structure to determine whether the TE extent of the tracking entry expands, by overlapping, an RE extent of any of a set of the reporting entries, (b) based on the TE extent of the tracking entry not expanding an RE extent of any of the set of reporting entries, creating a new reporting entry in the reporting structure based on the tracking entry, and (c) based on the TE extent of the tracking entry expanding an existing RE extent of one of the set of reporting entries, modifying the one reporting entry to identify an expanded RE extent spanning the existing RE extent and the TE extent of the tracking entry, the modifying of the one reporting entry reducing an amount of the newly written host data copied in the copying step by an amount of overlap between the existing RE extent and the TE extent of the tracking entry.

13. The data storage system of claim 12, wherein each tracking entry includes an offset and length for the TE extent of the write transaction, and further includes a device identifier and replication period identifier, the device identifier identifying a storage device to which the write transaction is directed, the replication period identifier identifying a specific replication period in which the write occurred and for which the tracking, reporting and copying operations are performed.

14. The data storage system of claim 12, wherein determining whether the tracking entry expands an RE extent of any of the set of the reporting entries includes determining whether the tracking entry is directed to an extent either adjoining or overlapping an RE extent of any of the set of reporting entries.

15. The data storage system of claim 12, wherein an expanded reporting entry is created based on a plurality of constituent write transactions that have modified the TE extents thereof, and includes (1) an offset taken from a lowest-range one of the constituent write transactions, and (2) an aggregated length value calculated using respective offsets and lengths of the constituent write transactions.

16. The data storage system of claim 12, wherein the reporting structure includes a b-tree employing a plurality of tree-organized, multi-entry nodes in which entries are ordered according to locations of their respective RE extents, and wherein creating a new reporting entry includes one of (1) adding the new reporting entry to an existing node, or (2) creating a new node and adding the new reporting entry to the new node.

17. The data storage system of claim 16, wherein creating a new node occurs as part of a node splitting operation for an existing node, the node splitting resulting in (1) the new node as a peer of the existing node, and (2) a new next-level node pointing to both the existing node and the new nodes, and wherein the new reporting entry and existing reporting entries of the existing node are distributed among the existing node, new node and new next-level node in a predetermined manner.

18. The data storage system of claim 17, wherein (1) the new next-level node receives a middle reporting entry among the reporting entries being distributed, (2) the existing node receives one or more of the existing reporting entries located below the middle reporting entry, and (3) the new node receives the new reporting entry.

19. The data storage system of claim 16, wherein modifying the one reporting entry includes expanding its RE extent to incorporate part or all of an RE extent of a peer reporting entry at a same level of the b-tree.

20. The data storage system of claim 16, wherein modifying the one reporting entry includes expanding its RE extent to incorporate part or all of an RE extent of a child reporting entry at a next lower level of the b-tree.

* * * * *